United States Patent
Bhonsle et al.

(10) Patent No.: US 12,505,252 B2
(45) Date of Patent: Dec. 23, 2025

(54) GENERATIVE RESPONSES WITH TRUST FOR LARGE LANGUAGE MODELS

(71) Applicant: Salesforce, Inc., San Francisco, CA (US)

(72) Inventors: Makarand Vishwas Bhonsle, San Francisco, CA (US); Atul Chandrakant Kshirsagar, San Francisco, CA (US); Prithvi Krishnan Padmanabhan, San Francisco, CA (US); Na Cheng, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/620,362

(22) Filed: Mar. 28, 2024

(65) Prior Publication Data
US 2025/0307462 A1    Oct. 2, 2025

(51) Int. Cl.
*G06F 21/62* (2013.01)
*G06F 40/166* (2020.01)
*G06F 40/284* (2020.01)
*G06F 40/40* (2020.01)

(52) U.S. Cl.
CPC ........ *G06F 21/6254* (2013.01); *G06F 40/166* (2020.01); *G06F 40/284* (2020.01); *G06F 40/40* (2020.01)

(58) Field of Classification Search
CPC .. G06F 21/6254; G06F 40/166; G06F 40/284; G06F 40/40
See application file for complete search history.

(56) References Cited

U.S. PATENT DOCUMENTS

| | | | | |
|---|---|---|---|---|
| 11,354,515 | B2 * | 6/2022 | Zhang | G06F 3/0481 |
| 11,663,517 | B2 * | 5/2023 | Asher | G06N 20/00 706/12 |
| 12,153,640 | B2 * | 11/2024 | Jiang | G06F 16/9535 |
| 2021/0157974 | A1 * | 5/2021 | Xie | H04L 51/52 |
| 2021/0234885 | A1 * | 7/2021 | Campbell | H04L 63/20 |
| 2022/0284500 | A1 * | 9/2022 | Sanghavi | G06N 5/04 |
| 2024/0144319 | A1 * | 5/2024 | Saidi | G06Q 30/0254 |

OTHER PUBLICATIONS

Inan et al., "Llama Guard: LLMbased Input Output Safeguard for Human AI Conversations", arXiv.org, Dec. 7, 2023, XP093257590.
(Continued)

*Primary Examiner* — Harunur Rashid
(74) *Attorney, Agent, or Firm* — Holland & Hart LLP

(57) ABSTRACT

An application server may receive, from a client and at an interface for accessing a large language model, a prompt for a response from the large language model. The application server may receive, via a model interface, a streaming output of the large language model, where the streaming output includes a first portion of the response and a threshold number of tokens. The application server may then provide the first portion of the response to a scoring model that determines a first incremental score indicating a first probability that the first portion of the response includes content from one or more content categories. The application server may transmit, to the client and based on the first probability, the first portion of the response, an indication of the first incremental score, or both.

16 Claims, 9 Drawing Sheets

(56) References Cited

OTHER PUBLICATIONS

ISA/US, "International Search Report and Written Opinion of the International Searching Authority," issued in connection with Int'l Appl. No. PCT/US25/22028, dated Aug. 29, 2025 (10 pages).
Jarvis Colin: "How to implement LLM guardrails", Dec. 19, 2023, XP093287191.
Musatoiu Teodora: "How to use the moderation API", Mar. 5, 2024, XP093287193.

* cited by examiner

GENERATIVE RESPONSES WITH TRUST FOR LARGE LANGUAGE MODELS

FIELD OF TECHNOLOGY

The present disclosure relates generally to database systems and data processing, and more specifically to generative responses with trust for large language models.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

DETAILED DESCRIPTION

Figure 1:
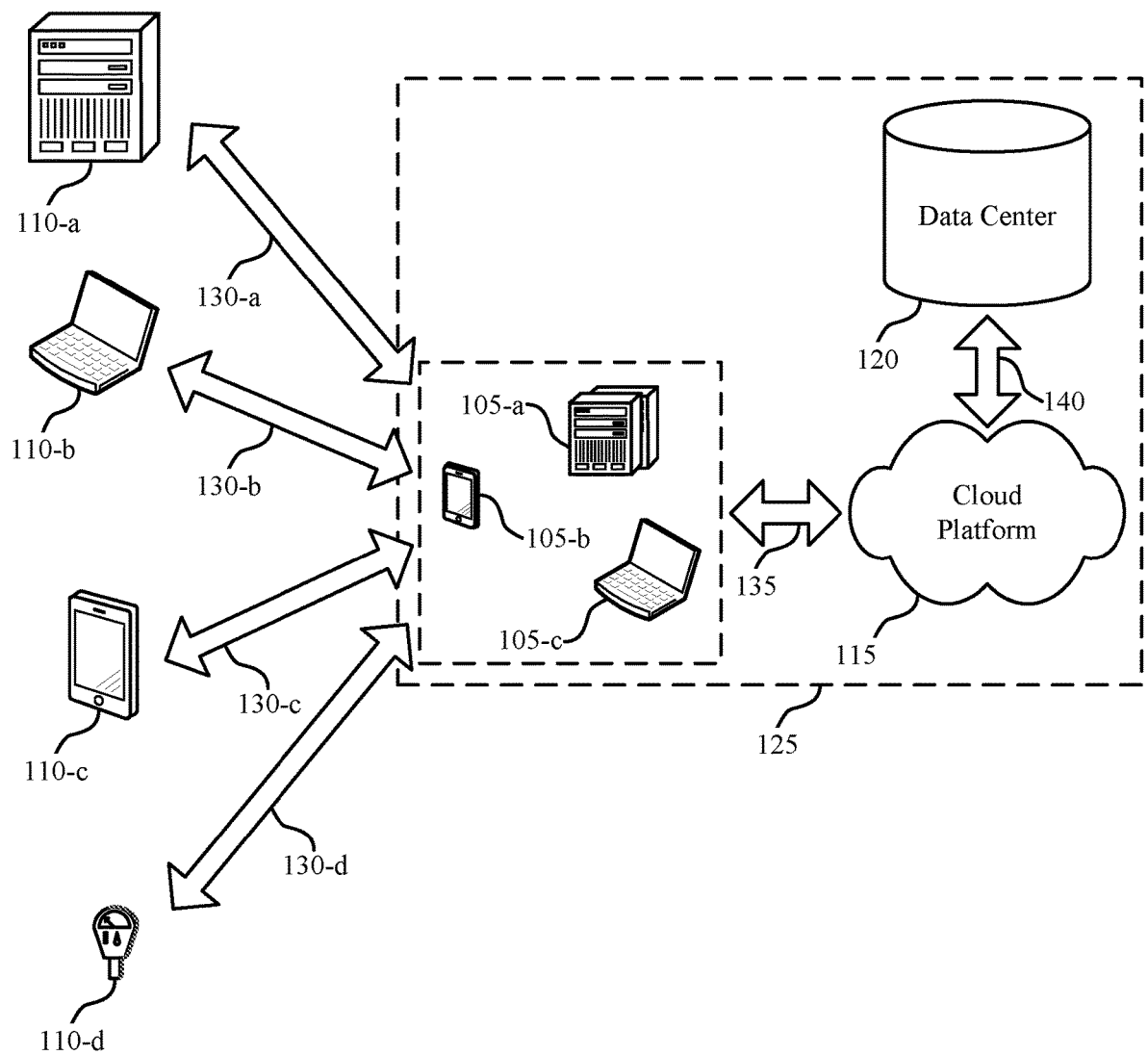
FIG. 1 illustrates an example of a method for data processing system that supports generative responses with trust for large language models in accordance with aspects of the present disclosure.

A cloud platform that is accessible by various organizations, tenants, users, and the like may support access to machine learning models to use for various tasks, such as customer relationship management (CRM) related tasks. However, the cloud platform may have access to various types of data, such as sensitive data (e.g., personally identifiable information) or other tenant data that the tenant does not want ingested by external systems such as a system that supports machine learning models. Further, users that are using a client that is configured for access to a machine learning model may purposefully or inadvertently input such data into a prompt. In some cases, the cloud platform may desire to audit responses from machine learning models to determine that the responses do not include unsafe content, such toxic content. In addition, the cloud platform may support a model interface that is used to moderate content intended for input into a machine learning model, such as a large language model and moderate content generated by the machine learning model. Such a model may provide a score for the generated content, the score categorizing the generated content as safe or unsafe. However, the cloud platform may desire to generate the content in a streaming format. In such a case, it may be challenging to calculate a score for a subset of the content (e.g., a streamed portion of the content) without having access to the entire generated content.

Techniques described herein provide for a scoring technique that is used to moderate a streaming content generated by a machine learning model by incrementally performing score calculations. The model interface may perform various techniques to moderate content. For example, the model interface may be configured to process a prompt received from a client to identify elements of sensitive information, such as personally identifiable information (PII). The interface may mask the elements of sensitive information by inserting masking elements (e.g., tags) into the prompt before providing the prompt to the model. If the model provides a response that includes the masking elements, then the model interface may replace the masking elements with the elements of sensitive information such that the response includes the input elements. Accordingly, in cases where the model is external to the cloud platform, the model interface may prevent sensitive or unauthorized data from being processed by the model while also providing a meaningful response that includes the input data. Additionally, the client provided prompt, the model provided response, or both may be provided to a separate model or service to determine whether the prompts or responses contain undesirable content, such as toxic content.

In some examples, the large language model may generate the content (e.g., in response to an input to a machine learning model) in a streaming format (e.g., the model provided response may be streamed in a token by token bases). The model may provide probability metrics that are indicative of whether the prompt or response contains content from one or more content categories, such as toxicity, hate, identity, violence, physical, sexual, and profanity categories. If one or more of the probabilities satisfy a threshold, then the model generated response may not be provided to the client, the response may be modified, and/or the client may be notified that the response contains content from one or more categories. An application server may provide for continuously streaming the generated content (e.g., in near real-time) to the customer. As the content is streamed to the customer, the application server may maintain a buffer for the streamed content. The application server may determine that a threshold number of tokens have been buffered prior to calculating a score for the generated content. For example, the model interface may receive an input and may start streaming a content generated in response to the input. As the content is streamed to the user, the content may also be buffered. Once the buffer includes a threshold number of tokens (e.g., words), the application server may invoke a safety model to generate an incremental safety score of the streaming content. With each new streamed word, the safety model may generate a new safety score for the generated content. The safety model may include the incremental safety score with each streamed content.

Aspects of the disclosure are initially described in the context of an environment supporting an on-demand database service. Aspects of the disclosure are further illustrated with reference to a computing environment and a process flow. Aspects of the disclosure are further illustrated by and described with reference to apparatus diagrams, system diagrams, and flowcharts that relate to generative responses with trust for large language models.

FIG. 1 illustrates an example of a system 100 for cloud computing that supports generative responses with trust for large language models in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

Techniques described herein address the foregoing by providing a model interface that performs content moderation and incremental score generation based on configurations provided by the cloud platform 115, the cloud clients 105, or a combination thereof. In some examples, the model interface is referred to as a "trust layer," in that it performs content moderation between a user/client and a model and vice versa (e.g., between the model and the user/client). Additionally, the "trust layer" may be responsible for calculating a probability of a particular response containing content from one or more content categories, such as toxicity, hate, identity, violence, physical, sexual, and profanity categories. For example, the cloud platform 115 may be configured to interface with one or more third party large language model services to provide large language model services to cloud clients 105.

In some examples, the model interface may support streaming content. In particular, a large language model may generate a subset of content at a time (on a word-by-word basis or a token-by-token basis). For instance, the large language model may support streaming generation responses to its clients. Streaming responses also has some added benefits, such as reduced perceived latency and cost-effectiveness.

As one example, a single streaming response may include a single token (as a content model may receive and hold a single token as it is being passed to the client). Unless this single token is explicitly an unsafe word, a trust model may fail in categorizing the token as safe/unsafe, because may lack contextual information to perform the safety analysis. For example, a token may be 5 characters long. A token, such as "12345" may not be indicative of safety. In addition to this, a large language model may add more contextual information towards the end of the generation. For example, when generating any factual content, the large language model may include a cautionary comment towards the end stating that "my training data was only limited to January 2022" or "I could be wrong, please do your due diligence." This nature of the large language model may change the nature of the content being generated in terms of safety. As such, applying trust classification/transforms on a streaming generative response may be fundamentally challenging, primarily because the large language model itself may noy know the next token in the stream.

In some cases, the model interface that is accessed by cloud clients 105 may implement the content moderation techniques described herein to moderate prompts provided to the third party services and to moderate responses provided by the third party large language model services. Additionally, or alternatively, the content moderation techniques may be customizable in accordance with configuration parameters, such that cloud clients have the ability to configure which content is filtered, removed, masked, etc. and which content is allowed to pass to the model and the client (e.g., based on safety thresholds). Similarly, the scoring techniques may be customizable in accordance with customer preferences.

The "trust layer" as depicted herein, may be implemented as a classification model. that takes input text and classifies that entire text as safe or unsafe. The "trust layer" also provide scores on individual categories, such as violence, hate, identity etc. The following is a sample trust output:

generation_safety_score ": {
"safety_score": 0.9901634,
"category_scores": {
"toxicity": 3.3E-4,
"hate": 0.0,
"identity": 5.0E-5,
"violence": 0.00208,
"physical": 1.0E-5,
"sexual": 0.00257,
"profanity": 3.0E-5,
"biased": 2.0E-5
}
}

The techniques described herein support reliable, safe, and secure access to large language models by cloud clients 105 and corresponding contacts 110. In particular, an application server (e.g., cloud platform) may receive, from a client and at an interface for accessing a large language model, a prompt for a response from the large language model. The application server may receive, via a model interface, a streaming output of the large language model, where the streaming output comprises a first portion of the response and comprises a threshold number of tokens. The application server may then provide the first portion of the response to a scoring model that determines a first incremental score indicating a first probability that the first portion of the response includes content from one or more content categories, and may transmit, to the client and based on the first probability, the first portion of the response, an indication of the first incremental score, or both.

Aspects of the present disclosure are described with respect to techniques for content moderation and streaming score generation associated with access to a model that is a large language model, but it should be understood that the techniques described herein may be used with respect to access to other types of machine learning models.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
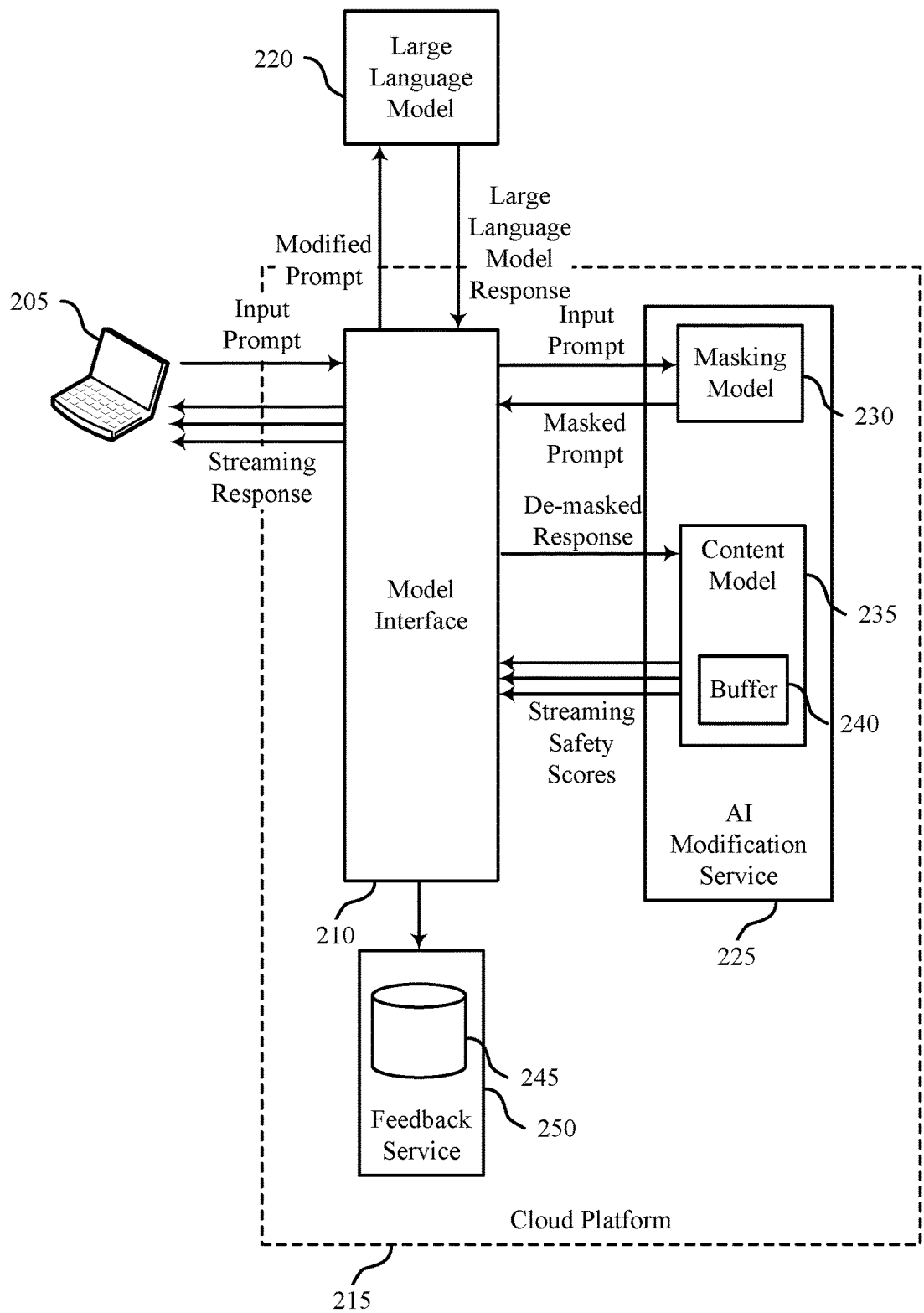
FIG. 2 shows an example of a computing environment that supports generative responses with trust for large language models in accordance with aspects of the present disclosure.

FIG. 2 shows an example of a computing environment 200 that supports generative responses with trust for large language models in accordance with aspects of the present disclosure. The computing environment 200 includes a client 205, a cloud platform 215, and a large language model 220, which may be examples of aspects of FIG. 1. For example, the client 205 may be an example of a cloud client 105 or contact 110 of FIG. 1 and the cloud platform 215 may be an example of aspects of the subsystem 125 of FIG. 1, such as the cloud platform 115 or an application server. The client 205 may represent an application (e.g., a generative artificial intelligence (AI) application or service that is configured to access generative AI services) that is accessible by users, such as a user associated with a cloud client 105 including employees or customers (e.g., contacts 110). Aspects of the application may be hosted by the cloud platform 215. In some cases, one or more users may configure the application using aspects of the cloud platform 215, and the application may be configured for performing various tasks, such as CRM related tasks described herein, for the cloud client 105, using generative AI.

The cloud platform 215 hosts various services for providing access to the large language model 220 by clients, such as the client 205. The cloud platform 215 may also host various other services, including CRM related services as described with respect to FIG. 1. As described herein, the cloud platform 215 may host services for content moderation and score generation for interfacing with the large language model 220. The large language model 220 may be an externally hosted large language model, such as a third party large language model hosted on servers separate from the servers that host the cloud platform 215. Additionally, or alternatively, the large language model may be hosted on servers associated with the cloud platform 215. In such cases, the cloud platform 215 may be configured to support a bring your own model (BYOM) approach, whereby clients can upload or configure a custom large language model at the cloud platform 215. As described herein, the cloud platform 215 hosts services and performs techniques for supporting data privacy, security, and content safety in large language model access. Whether cloud clients configure their own models or use a model configured with or supported by the cloud platform 215, the trust layer may be embedded with and used with other components of the cloud platform 215, such as various services supported by the cloud platform 215 including CRM services, communication services, and the like.

The cloud platform 215 may include a model interface 210, which receives or obtains input prompts from various applications, including the client 205. For example, the model interface 210 receives the input prompt from the client 205. The model interface 210 may be configured to facilitate various aspects of content moderation for large language model interaction as described herein. Additionally, the content moderation may be performed in accordance with configuration parameters. The configuration parameters may be associated with or configured in association with aspects of the cloud platform 215. In some cases, the client (e.g., cloud client 105) may configure the configuration parameters. More particularly, as the cloud platform 215 may host various different cloud clients 105 (e.g., tenants), each cloud client 105 may have a different and respective set of configuration parameters that are indicative of how the cloud platform 215 is to perform content moderation for large language model interaction.

In some cases, after receiving the input prompt, the model interface may provide the input prompt to an AI modification service 225, which hosts various services for content moderation, such as a masking model 230 and a content model 235. The masking model 230 may be configured to modify the input prompt to generate a modified input prompt. For example, the masking model 230 may be configured to process the input prompt, determine that the input prompt contains one or more elements of sensitive information, and replace the elements of sensitive information with masking elements. Sensitive information may include PII, payment card industry (PCI) information, protected health information (PHI), and/or information flagged by the cloud client 105 (e.g., the configuration parameters associated with the cloud client 105) as being sensitive or restricted. The masking model 230 may be configured to implement various techniques to identify the elements for sensitive information, such as named entity recognition (NER) techniques, regular expressions (regex), and other information extraction or identification techniques. Additionally, as the cloud platform 215 may host or access various types of data associated with a cloud client 105, the cloud client 105 may flag various data objects (e.g., data tables) and/or fields (e.g., columns) of data objects as being restricted or sensitive. That is, the multi-tenant system may have a set of data tables or objects that may be accessed using facilities of the cloud client 105. However, one or more of the tables or fields may be restricted from being accessible by the large language model. The flagging of such information may be an example of the configuration parameters that are used for prompt modification as described herein. In such cases, the masking model 230 may access information that indicates that the objects and/or fields are flagged and identify such corresponding information in the input prompt and mask the information as described herein.

Thus, after identifying the elements of sensitive information in the input prompt, the masking model 230 may replace the elements with masking elements. The masking elements may be indicative of the type of sensitive information. For example, if an input prompt includes a name of a first person and a name of a second person, then these names may be replaced with the masking elements <PERSON_0> and <PERSON_1> respectively. Similarly, if the input prompt includes a credit card number, then the masking model 230 may replace the credit card number with the masking element <CREDIT_CARD_0>. The masking model 230 or an associated service may maintain a mapping of masking elements to sensitive elements for de-masking, as described in further detail herein. Information that is masked may include financial information, full names, contact information, government issued identification numbers, login credentials, objects, fields, and the like.

The AI modification service 225 may also perform various other techniques for modifying the input prompt. For example, the AI modification service 225 may implement techniques for prompt defense to prevent adversarial prompt injection attacks. For instance, the AI modification service 225 may employ various heuristic approaches for defending prompts, such as instruction defense, post-prompting, prompt enclosure, prompt filtering, and prompt length restrictions. For instruction defense, the AI modification service 225 may instruct the model (by inserting additional instructions in the prompt) to be careful about what comes next in the prompt. For post-prompting, the AI modification service 225 may insert user input toward the beginning of the prompt, as large language models may often follow the last instructions that the model processes. For prompt enclosure, the AI modification service 225 may sandwich or enclose the input prompt within two prompts, within a random sequence of characters, or within XML tags so that the model is limited from referencing other elements in the prompt such that the prompt is tightly controlled. Thus, the AI modification service 225 may insert sets of characters (e.g., random characters, XML tags, other prompt strings) before and/or after the input prompt. Prompt filtering may include identification and deletion of specific words or phrases (e.g., as included in a reference data store) before the prompt is provided to the large language model. Thus, the AI modification service 225 may implement various prompt defense techniques, which allows the service to integrate defensive prompt text seamlessly (e.g., using a "raw content" field that acts as a protective layer around user-defined prompt instructions). A "prompt prefix" is used within the raw content field to emphasize caution and a "prompt suffix" as the final directive to the large language model for added security. Other prompt defense techniques are contemplated within the context of the present disclosure.

After the input prompt is modified by the AI modification service 225 to generate the modified prompt (e.g., a masked prompt), the model interface 210 may transmit the modified prompt to, or otherwise provide the prompt to, the large language model 220. Transmission of the modified prompt may include calling an application programming interface (API) endpoint associated with the large language model. The API request may include additional information or instructions for the large language model 220, such as instructions to not store the information included in the prompt, response formatting instructions, or the like. The large language model 220, in response to the modified prompt, may provide a large language model response that is generated by the large language model 220.

The large language model response, which is provided to the model interface 210, may be further processed for content moderation. For example, the large language model response may be provided to the masking model 230 such that the response may be de-masked. That is, the response may include the masking elements that were provided in the modified prompt. As such, to provide a meaningful response, the masking model 230 may use the mapping of sensitive elements to masking elements to de-mask the response by replacing the masking elements with the elements of sensitive information. Thus, if the response includes the masking element <PERSON_1>, then the <PERSON_1> masking element is replaced with the name mapped to the <PERSON_1> masking element (as mapped by the masking model 230 for the input prompt). In some examples, the large language model 220 may generate a streaming output, where the streaming output includes a first portion of the response and includes a threshold number of tokens. For instance, instead of generating the entire response to the prompt, the large language model can provide a streaming response, where the response is streamed on a word-by-word basis.

As depicted with reference to FIG. 2, the de-masked prompt may be provided to a content model 235 of the AI modification service 225 for determining whether the response includes content from one or more content categories. For example, the content model 235 may process the response and generate probabilities that the response contains content from one or more categories. The one or more categories may include content categories that correspond to content that is deemed unsafe, derogatory, toxic or the like. The content categories may include toxicity, hate, identity, violence, physical, sexual, profanity, or a combination thereof. In this example, the content model 235 may process the streaming response and may incrementally calculate a safety score for each response streamed from the large language model 220. In some cases, probabilities for each category or an overall probability may be analyzed with reference to a threshold. For example, if one or more of the probabilities satisfy the threshold, then the response may be modified and/or the model interface 210 may refrain from transmitting the response to the client 205. In other cases, the AI modification service 225 may indicate, to the client 205, that the generated response includes content from one or more categories. This indication may be transmitted with the response or instead of the response. Upon receiving a first portion of the response (streaming response) including a set of tokens (a subset of the entire response), the content model 235 may store the set of tokens in buffer 240 and may generate probabilities that the set of tokens contains content from one or more categories. In some cases, the content model 235 may receive a new token from the large language model 220 after receiving the first portion of the response. In this case, the content model 235 may add the newly generated token to the buffer 240 and may generate probabilities that the response including the newly generated token (e.g., first set of tokens and the newly generated token) contains content from one or more categories.

As depicted herein, the buffer 240 may store tokens received from the large language model 220 (large language model response). Once enough tokens have buffered, the content model 235 invoke a "near-service" safety model on the buffered content, and include the safety score in the next stream response. The content model 235 may continue buffering the stream response as it is made available and with each incremental buffer, the content model 235 may continually invoke the safety model to calculate a new safety score of the newly buffered content and include that in the next response. This process is continued until the actual stream from the large language model ends. Thus, the control model 235 streams intermediate safety scores until the streaming input from the large language model 220 ends. The content model 235 may continue to send new safety scores to the client 205, while buffering the intermediate safety scores. In some examples, the intermediary safety scores may be used for various purposes, such as inputs to the next safety model call and/or to normalize the next safety score response from the gateway (e.g., content model 235) for an ongoing request. As a result, at the end of the transaction, the client 205 may have a list of safety scores, with the last safety score being the overall safety of the entire generative output. As can be noted, the cloud platform 215 may not assume any specific client implementation, and the client 205 can react accordingly to the intermediary safety scores or to the final overall safety score.

Thus, given an input text, the content model 235 may output an overall safety score from 0 (least safe) to 1 (most safe). The content model 235 may also output several category sub-scores representing the probability that the text contains toxic, hateful, violent, sexual, identity, physical or profanity content. Further, score thresholds may be set to determine appropriate remediation actions depending on the use case. Thus, different thresholds and different remediation actions may be configured based on a use case and/or cloud client 105, and different cloud clients 105 (and use cases within a cloud client 105) may have different thresholds and remediation actions. Thus, the thresholds and actions may be examples of configuration parameters that are used by the cloud platform 215 for content moderation.

Upon receiving the streaming response, the content model 235 may output an overall safety score for the first portion of response. The content model 235 may then calculate and output an overall safety score for the second portion of the response (including the first set of tokens and the new token). Accordingly, the content model 235 may stream the safety scores to the client 205 (via model interface 210).

In some examples, the AI modification service 225 may include functionality that is used to detect bias, inclusion of copyrighted work, or the like. Additionally, the AI modification service 225 may process the response to determine accuracy and relevance based on the prompt. In some cases, a second call to the large language model 220 may be used to verify the initial response. Additionally, the cloud platform 215 may implement techniques to automate validation of responses against existing data (e.g., CRM data) or client supplied reference data. As described herein, the cloud platform 215, the large language model 220, or both may implement a zero data retention policy.

Additionally, the model interface 210 may facilitate techniques for providing an audit trail for transparency and control. For example, the response and the corresponding information may be provided to a feedback service 250, which stores the information in one or more data stores 245, which may be an example of aspects of the data center 120 as described with respect to FIG. 1. Further, the cloud platform 215 may provide transparency through dashboard and alerting. Safety scores and toxicity scores on prompts and their outputs may be aggregated and made available via a dashboard to provide transparency to cloud clients. Cloud clients may also have the ability to drill down to the details of any record and review details, invoke actions to deactivate the prompt, adjust the prompt etc. The cloud client may set up alert measures on the dashboard. The alerting system may notify customers if any prompts contain malicious inputs or toxic outputs, allowing them to invoke swift action and prevent any potential harm. Additionally, or alternatively, the customers may provide an input indicating a probability threshold for the first probability for displaying a safety score and/or a corresponding response.

As depicted herein, the computing environment 200 supports a continuous stream safety scoring method with incremental safety score calculations. The streaming content may be buffered (in buffer 240) while continually sending the stream to the client.

As described herein, various aspects of content moderation may be configurable. The cloud clients, users, customers, etc. may configure various aspects of the trust layer as described herein. In some cases, users may configure aspects of the configuration parameters. For example, users may configure types of sensitive information to be masked, configure thresholds for safety/toxicity scores of input prompts, thresholds for safety/toxicity scores of generated response, etc. Further, the cloud clients may proactively block prompts from reaching the large language model 220 based on specific toxicity, sensitive information, safety criteria, etc.

Figure 3:
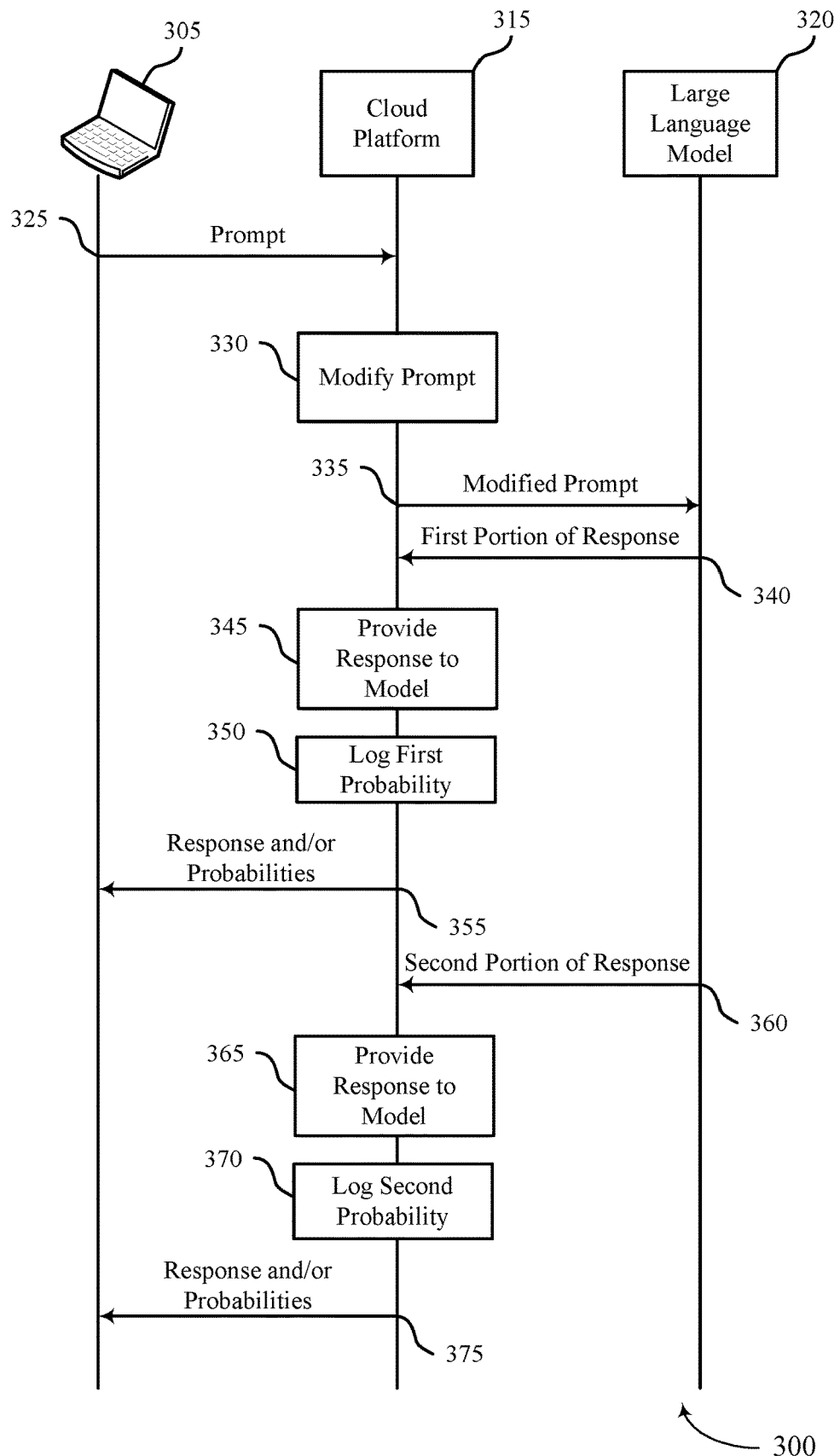
FIG. 3 shows an example of a process flow that supports generative responses with trust for large language models in accordance with aspects of the present disclosure.

FIG. 3 shows an example of a process flow 300 that supports generative responses with trust for large language models in accordance with aspects of the present disclosure. The process flow 300 includes a client 305, a cloud platform 315, and a large language model 320, which may be examples of the corresponding devices and systems as described with respect to FIGS. 1 through 2.

At 325, a model interface of the cloud platform may receive, from the client 305, a prompt for a response from the large language model 320. The client 305 may be associated with a set of configuration parameters via the cloud platform 315 that supports the model interface. For example, the cloud platform 315 may be configured with a set of configuration parameters that are to be applied to prompts received from the client 305 based on a cloud client (e.g., organization) configuration, client configuration, or other configuration as described with respect to FIG. 2.

At 330, the cloud platform 315 may modify, in accordance with the set of configuration parameters, the prompt that results in a modified prompt. Modifying the prompt may include determining that the prompt includes one or more elements of sensitive information and replacing the one or more elements of sensitive information with one or more respective masking elements. The one or more elements of sensitive information may include PII, PCI information, PHI, or a combination thereof. The elements of sensitive information may additionally or alternatively include information that is flagged to be masked in accordance with the set of configuration parameters. Modifying the prompt may include inserting a first set of characters prior to the prompt to generate the modified prompt, inserting a second set of characters after the prompt to generate the modified prompt, or inserting the first set of characters prior to the prompt and inserting the second set of characters after the prompt to generate the modified prompt.

At 335, the cloud platform 315 may transmit, to the large language model 320 via a model interface, the modified prompt. The model interface may be an API.

At 340, the cloud platform 315 may receive, via the model interface, the response to the modified prompt. The response is a streaming output of the large language model 340, where the streaming output includes a first portion of the response and includes a threshold number of tokens.

At 345, the cloud platform 315 may provide the first portion of the response to a model that determines a first incremental score indicating a first probability that the first portion of the response includes content from one or more content categories. The model may be example of the content model 235 (or scoring model) as described with respect to FIG. 2. At 350, the cloud platform 315 may log the first probability associated with the first portion of the response, the indication of the first incremental score, or both.

At 355, the cloud platform 315 may transmit, to the client 305 and based on the first probability, the first portion of the response, an indication of the first incremental score, or both. For example, if the one or more probabilities are above a threshold, then the cloud platform 315 may indicate to the client 305 that the response contains unsafe or toxic content. If the one or more probabilities are below the threshold, then the cloud platform 315 may return the response without an indication of the probabilities.

At 360, the cloud platform 315 may receive, via the model interface, a second portion of the response to the modified prompt. The second portion of the response may include a new token from the large language model 320 after receiving the first portion of the response at 340.

At 365, the cloud platform 315 may provide the second portion of the response to a model determines a second incremental score indicating a second probability that the second portion of the response includes content from one or more content categories. At 370, the cloud platform 315 may log the second probability associated with the second portion of the response, an indication of the second incremental score, or both.

At 375, the cloud platform 315 may transmit, to the client 305 and based on the second probability, the new token, the indication of the second incremental score, or both.

Figure 4:
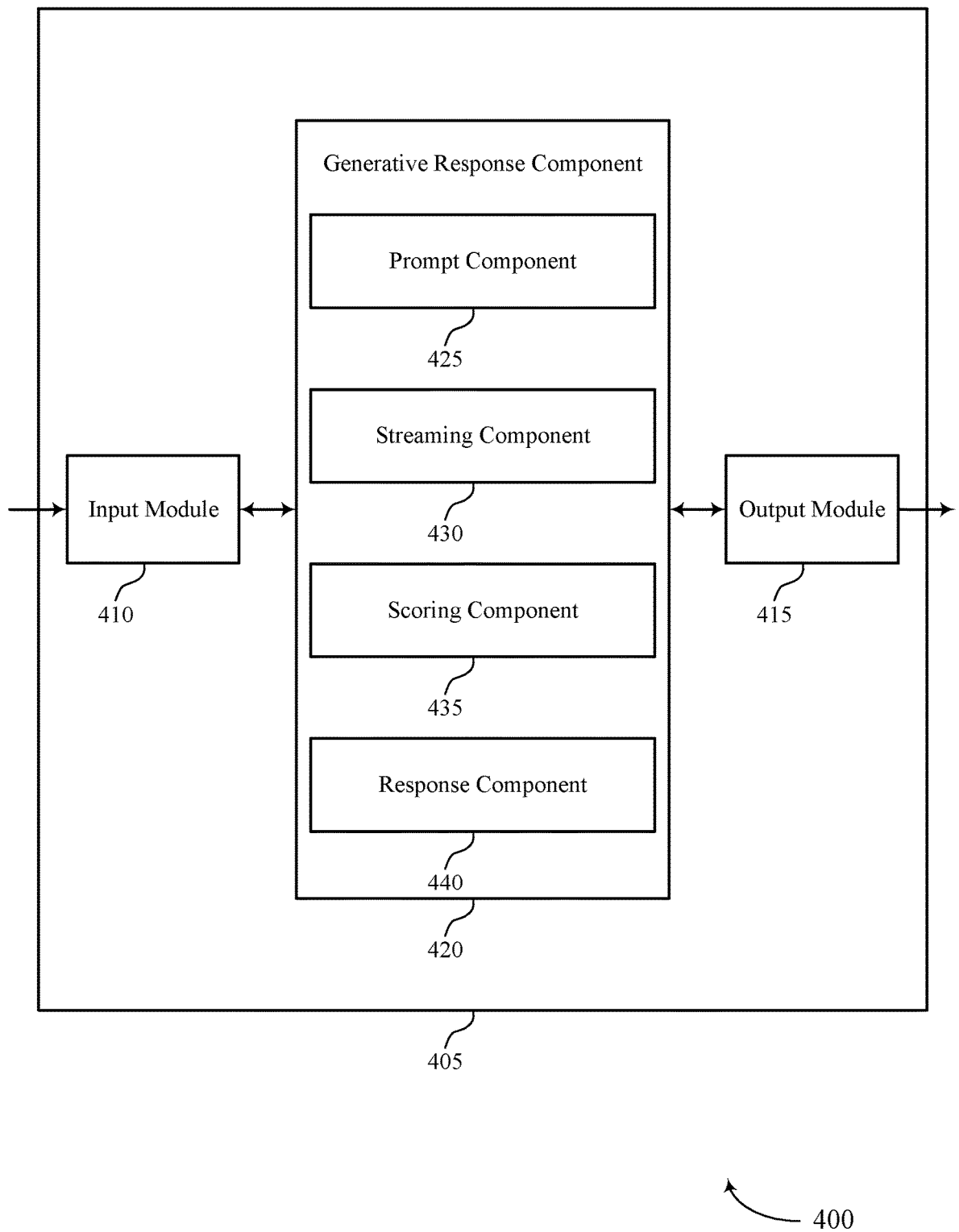
FIG. 4 shows a block diagram of an apparatus that supports generative responses with trust for large language models in accordance with aspects of the present disclosure.

FIG. 4 shows a block diagram 400 of a device 405 that supports generative responses with trust for large language models in accordance with aspects of the present disclosure. The device 405 may include an input module 410, an output module 415, and a generative response component 420. The device 405, or one of more components of the device 405 (e.g., the input module 410, the output module 415, the generative response component 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the generative response component 420 to support generative responses with trust for large language models. In some cases, the input module 410 may be a component of an input/output (I/O) controller 610 as described with reference to FIG. 6.

The output module 415 may manage output signals for the device 405. For example, the output module 415 may receive signals from other components of the device 405, such as the generative response component 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the generative response component 420 may include a prompt component 425, a streaming component 430, a scoring component 435, a response component 440, or any combination thereof. In some examples, the generative response component 420, or various components thereof, may be configured to perform various operations (e.g., receiving, monitoring, transmitting) using or otherwise in cooperation with the input module 410, the output module 415, or both. For example, the generative response component 420 may receive information from the input module 410, send information to the output module 415, or be integrated in combination with the input module 410, the output module 415, or both to receive information, transmit information, or perform various other operations as described herein.

The generative response component 420 may support data processing in accordance with examples as disclosed herein. The prompt component 425 may be configured to support receiving, from a client and at an interface for accessing a large language model, a prompt for a response from the large language model. The streaming component 430 may be configured to support receiving, via a model interface, a streaming output of the large language model, where the streaming output includes a first portion of the response and includes a threshold number of tokens. The scoring component 435 may be configured to support providing the first portion of the response to a scoring model that determines a first incremental score indicating a first probability that the first portion of the response includes content from one or more content categories. The response component 440 may be configured to support transmitting, to the client and based on the first probability, the first portion of the response, an indication of the first incremental score, or both.

Figure 5:
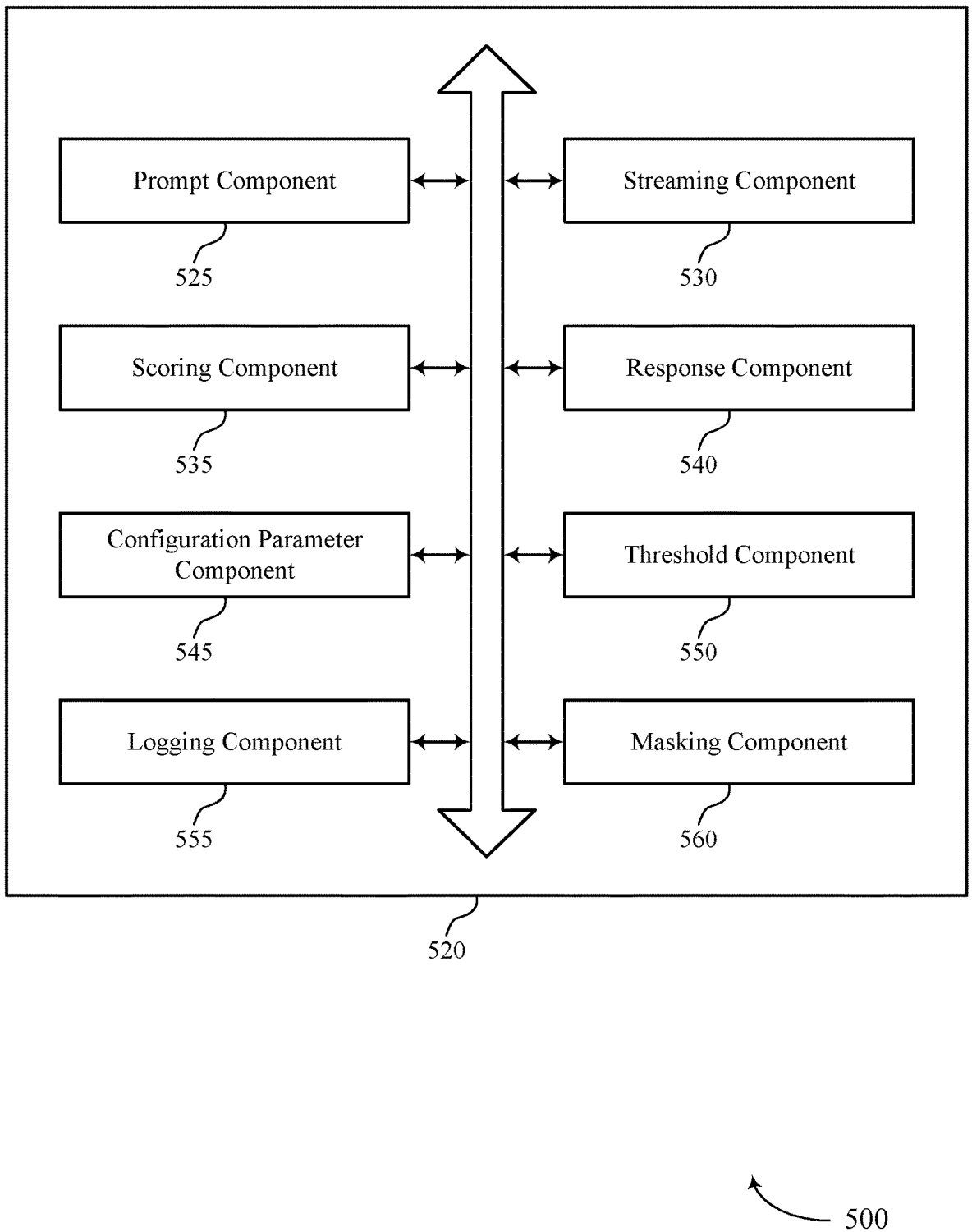
FIG. 5 shows a block diagram of a generative response component that supports generative responses with trust for large language models in accordance with aspects of the present disclosure.

FIG. 5 shows a block diagram 500 of a generative response component 520 that supports generative responses with trust for large language models in accordance with aspects of the present disclosure. The generative response component 520 may be an example of aspects of a generative response component 420, or both, as described herein. The generative response component 520, or various components thereof, may be an example of means for performing various aspects of generative responses with trust for large language models as described herein. For example, the generative response component 520 may include a prompt component 525, a streaming component 530, a scoring component 535, a response component 540, a configuration parameter component 545, a threshold component 550, a logging component 555, a masking component 560, or any combination thereof. Each of these components, or components of subcomponents thereof (e.g., one or more processors, one or more memories), may communicate, directly or indirectly, with one another (e.g., via one or more buses).

The generative response component 520 may support data processing in accordance with examples as disclosed herein. The prompt component 525 may be configured to support receiving, from a client and at an interface for accessing a large language model, a prompt for a response from the large language model. The streaming component 530 may be configured to support receiving, via a model interface, a streaming output of the large language model, where the streaming output includes a first portion of the response and includes a threshold number of tokens. The scoring component 535 may be configured to support providing the first portion of the response to a scoring model that determines a first incremental score indicating a first probability that the first portion of the response includes content from one or more content categories. The response component 540 may be configured to support transmitting, to the client and based on the first probability, the first portion of the response, an indication of the first incremental score, or both.

In some examples, to support receiving the streaming output of the large language model, the streaming component 530 may be configured to support receiving a new token from the large language model after receiving the first portion of the response. In some examples, the streaming component 530 may be configured to support determining a second portion of the response including the threshold number of tokens and the new token. In some examples, the response component 540 may be configured to support providing the second portion of the response to the scoring model that determines a second incremental score indicating a second probability that the second portion of the response includes content from one or more content categories.

In some examples, the response component 540 may be configured to support transmitting, to the client and based on the second probability, the new token, an indication of the second incremental score, or both. In some examples, the scoring component 535 may be configured to support determining whether a difference between the first incremental score and the second incremental score satisfies a threshold, where the indication of the second incremental score is transmitted to the client based on the difference between the first incremental score and the second incremental score satisfying the threshold.

In some examples, the configuration parameter component 545 may be configured to support determining that the client is associated with a set of configuration parameters via a cloud platform that supports the interface. In some examples, the prompt component 525 may be configured to support modifying, in accordance with the set of configuration parameters, the prompt that results in a modified prompt. In some examples, the prompt component 525 may be configured to support transmitting, to the large language model via the model interface, the modified prompt, where receiving the streaming output is in response to transmitting the modified prompt.

In some examples, to support modifying the prompt, the masking component 560 may be configured to support determining that the prompt includes one or more elements of sensitive information. In some examples, to support modifying the prompt, the masking component 560 may be configured to support replacing the one or more elements of sensitive information with one or more respective masking elements.

In some examples, the one or more elements of sensitive information include PII, PCI information, PHI, or a combination thereof. In some examples, the threshold component 550 may be configured to support determining whether the first probability satisfy a threshold, where the first probability, the first portion of the response, an indication of the first incremental score, or both are transmitted to the client based on the first probability satisfying the threshold.

In some examples, the logging component 555 may be configured to support logging the first probability associated with the first portion of the response, the indication of the first incremental score, or both. In some examples, the threshold component 550 may be configured to support receiving, from the client, an input indicating a probability threshold for the first probability, where transmitting the first portion of the response, the indication of the first incremental score, or both, is based on the first probability satisfying the probability threshold.

Figure 6:
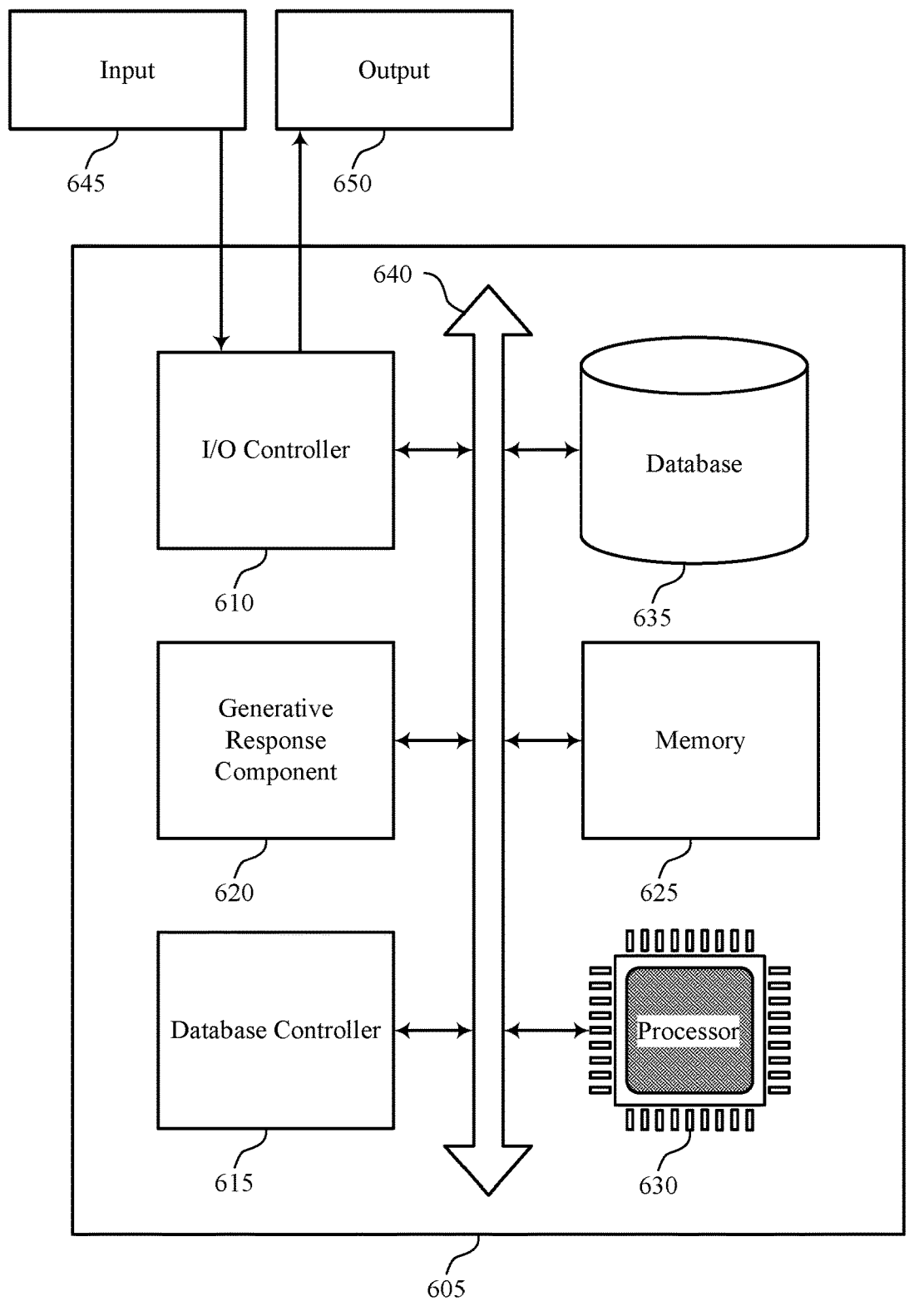
FIG. 6 shows a diagram of a system including a device that supports generative responses with trust for large language models in accordance with aspects of the present disclosure.

FIG. 6 shows a diagram of a system 600 including a device 605 that supports generative responses with trust for large language models in accordance with aspects of the present disclosure. The device 605 may be an example of or include components of a device 405 as described herein. The device 605 may include components for bi-directional data communications including components for transmitting and receiving communications, such as a generative response component 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting generative responses with trust for large language models). The processor 630 may be an example of a single processor or multiple processors. For example, the device 605 may include one or more processors 630.

The generative response component 620 may support data processing in accordance with examples as disclosed herein. For example, the generative response component 620 may be configured to support receiving, from a client and at an interface for accessing a large language model, a prompt for a response from the large language model. The generative response component 620 may be configured to support receiving, via a model interface, a streaming output of the large language model, where the streaming output includes a first portion of the response and includes a threshold number of tokens. The generative response component 620 may be configured to support providing the first portion of the response to a scoring model that determines a first incremental score indicating a first probability that the first portion of the response includes content from one or more content categories. The generative response component 620 may be configured to support transmitting, to the client and based on the first probability, the first portion of the response, an indication of the first incremental score, or both.

By including or configuring the generative response component 620 in accordance with examples as described herein, the device 605 may support techniques improved reliability, reduced latency, and improved user experience.

Figure 7:
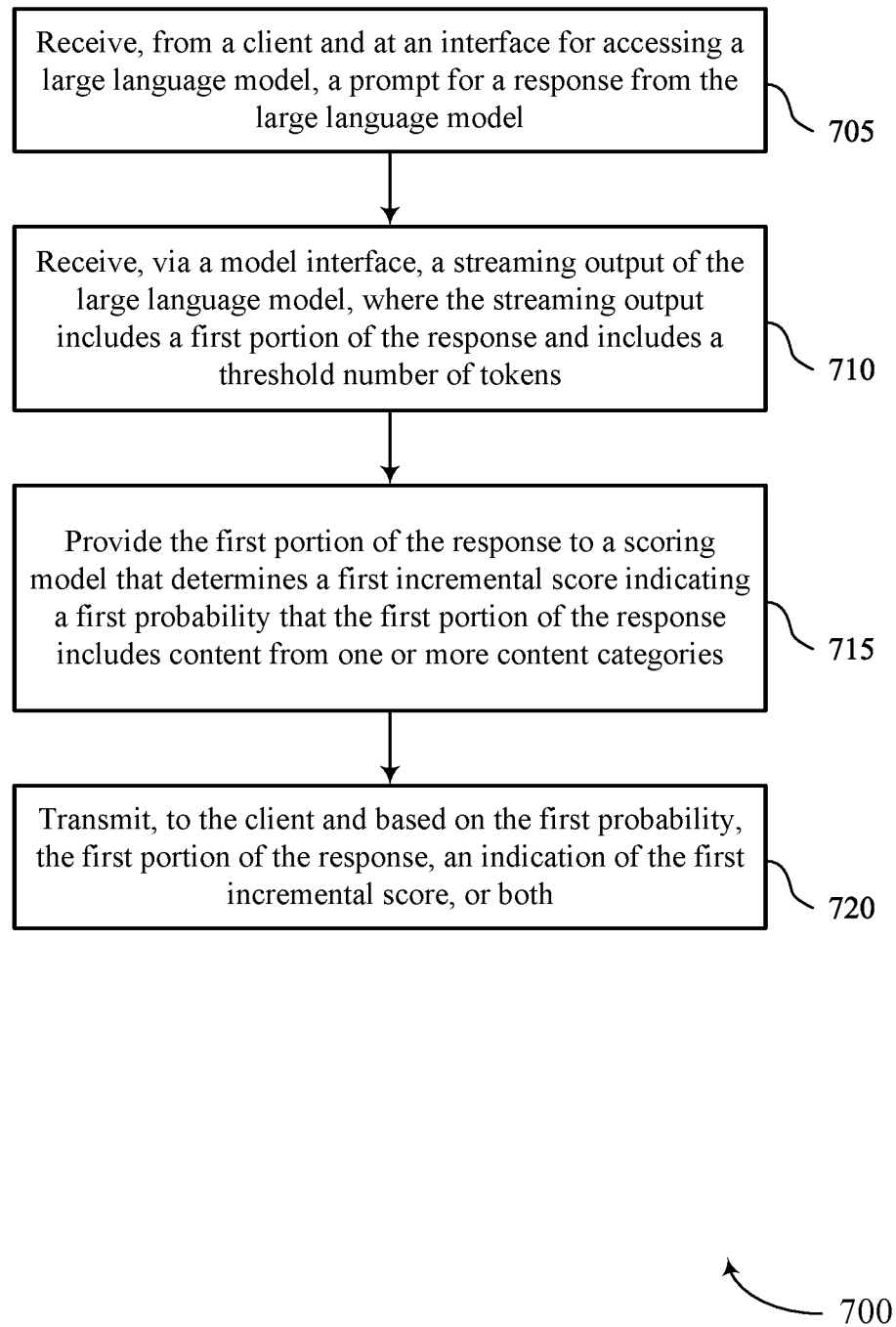
FIGS. 7 through 9 show flowcharts illustrating methods that support generative responses with trust for large language models in accordance with aspects of the present disclosure.

FIG. 7 shows a flowchart illustrating a method 700 that supports generative responses with trust for large language models in accordance with aspects of the present disclosure. The operations of the method 700 may be implemented by an application server or its components as described herein. For example, the operations of the method 700 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 705, the method may include receiving, from a client and at an interface for accessing a large language model, a prompt for a response from the large language model. The operations of 705 may be performed in accordance with examples as disclosed herein. In some examples, aspects of the operations of 705 may be performed by a prompt component 525 as described with reference to FIG. 5.

At 710, the method may include receiving, via a model interface, a streaming output of the large language model, where the streaming output includes a first portion of the response and includes a threshold number of tokens. The operations of 710 may be performed in accordance with examples as disclosed herein. In some examples, aspects of the operations of 710 may be performed by a streaming component 530 as described with reference to FIG. 5.

At 715, the method may include providing the first portion of the response to a scoring model that determines a first incremental score indicating a first probability that the first portion of the response includes content from one or more content categories. The operations of 715 may be performed in accordance with examples as disclosed herein. In some examples, aspects of the operations of 715 may be performed by a scoring component 535 as described with reference to FIG. 5.

At 720, the method may include transmitting, to the client and based on the first probability, the first portion of the response, an indication of the first incremental score, or both. The operations of 720 may be performed in accordance with examples as disclosed herein. In some examples, aspects of the operations of 720 may be performed by a response component 540 as described with reference to FIG. 5.

Figure 8:
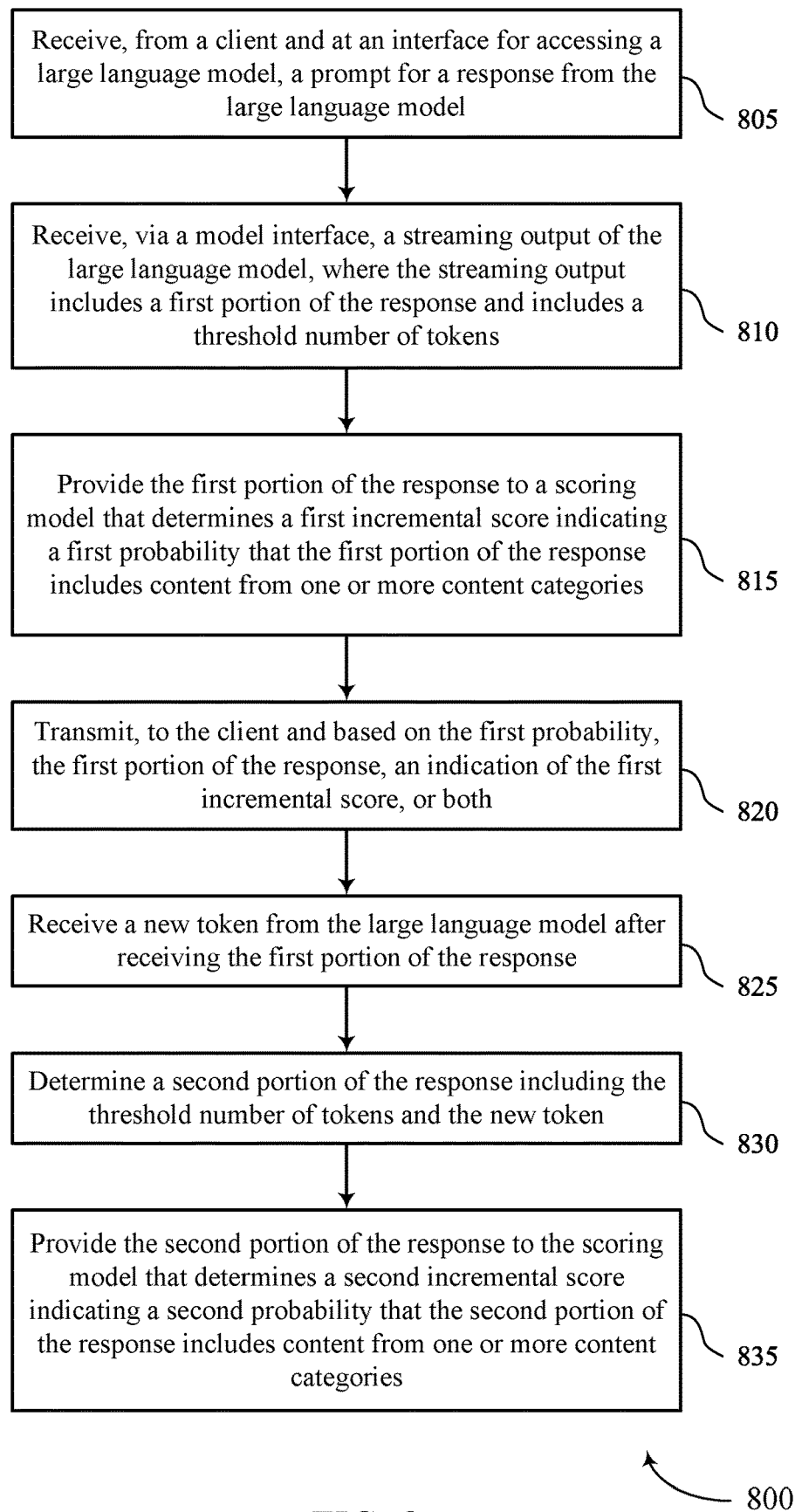

FIG. 8 shows a flowchart illustrating a method 800 that supports generative responses with trust for large language models in accordance with aspects of the present disclosure. The operations of the method 800 may be implemented by an application server or its components as described herein. For example, the operations of the method 800 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 805, the method may include receiving, from a client and at an interface for accessing a large language model, a prompt for a response from the large language model. The operations of 805 may be performed in accordance with examples as disclosed herein. In some examples, aspects of the operations of 805 may be performed by a prompt component 525 as described with reference to FIG. 5.

At 810, the method may include receiving, via a model interface, a streaming output of the large language model, where the streaming output includes a first portion of the response and includes a threshold number of tokens. The operations of 810 may be performed in accordance with examples as disclosed herein. In some examples, aspects of the operations of 810 may be performed by a streaming component 530 as described with reference to FIG. 5.

At 815, the method may include providing the first portion of the response to a scoring model that determines a first incremental score indicating a first probability that the first portion of the response includes content from one or more content categories. The operations of 815 may be performed in accordance with examples as disclosed herein. In some examples, aspects of the operations of 815 may be performed by a scoring component 535 as described with reference to FIG. 5.

At 820, the method may include transmitting, to the client and based on the first probability, the first portion of the response, an indication of the first incremental score, or both. The operations of 820 may be performed in accordance with examples as disclosed herein. In some examples, aspects of the operations of 820 may be performed by a response component 540 as described with reference to FIG. 5.

At 825, the method may include receiving a new token from the large language model after receiving the first portion of the response. The operations of 825 may be performed in accordance with examples as disclosed herein. In some examples, aspects of the operations of 825 may be performed by a streaming component 530 as described with reference to FIG. 5.

At 830, the method may include determining a second portion of the response including the threshold number of tokens and the new token. The operations of 830 may be performed in accordance with examples as disclosed herein. In some examples, aspects of the operations of 830 may be performed by a streaming component 530 as described with reference to FIG. 5.

At 835, the method may include providing the second portion of the response to the scoring model that determines a second incremental score indicating a second probability that the second portion of the response includes content from one or more content categories. The operations of 835 may be performed in accordance with examples as disclosed herein. In some examples, aspects of the operations of 835 may be performed by a response component 540 as described with reference to FIG. 5.

Figure 9:
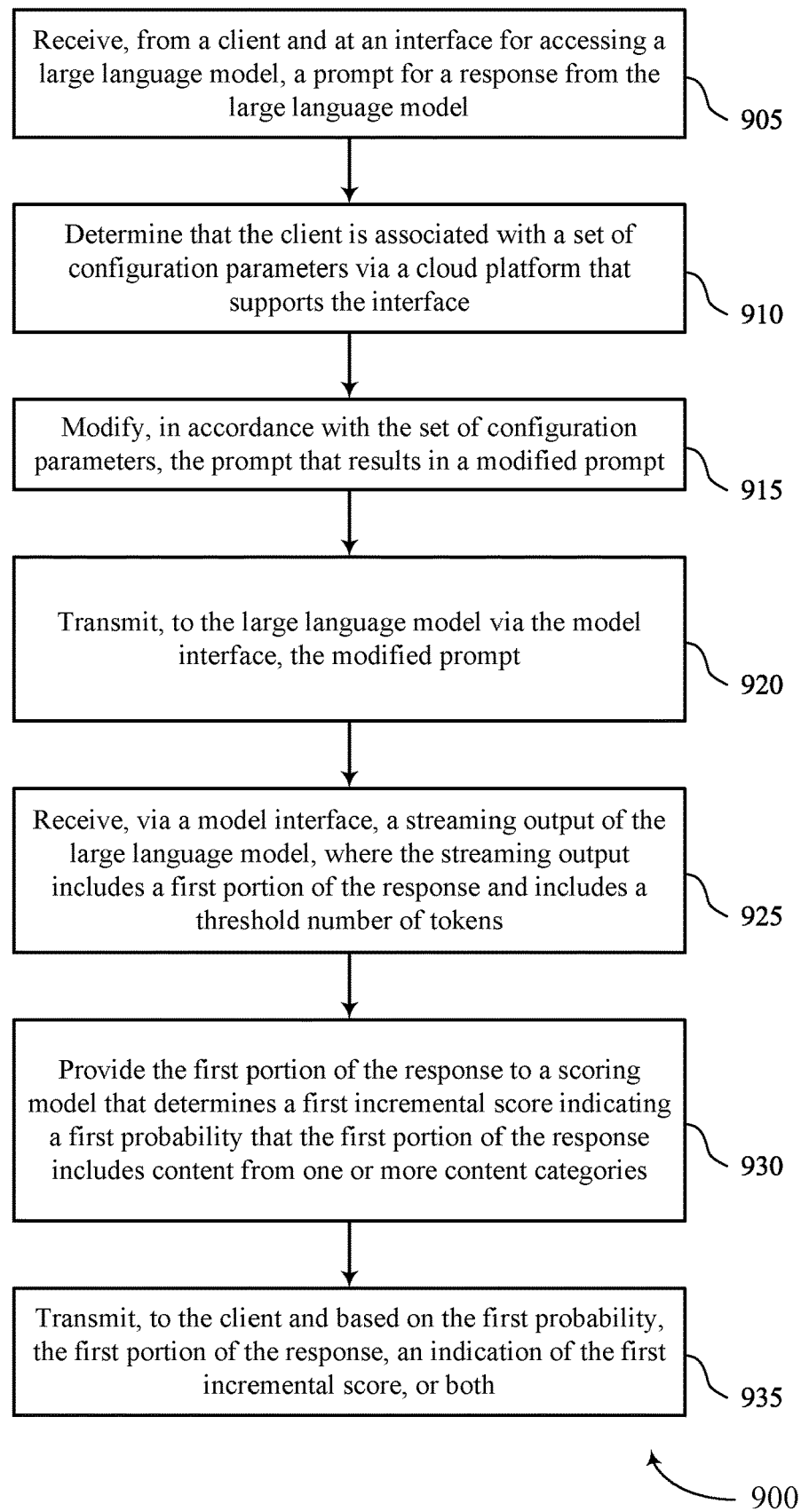

FIG. 9 shows a flowchart illustrating a method 900 that supports generative responses with trust for large language models in accordance with aspects of the present disclosure. The operations of the method 900 may be implemented by an application server or its components as described herein. For example, the operations of the method 900 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 905, the method may include receiving, from a client and at an interface for accessing a large language model, a prompt for a response from the large language model. The operations of 905 may be performed in accordance with examples as disclosed herein. In some examples, aspects of the operations of 905 may be performed by a prompt component 525 as described with reference to FIG. 5.

At 910, the method may include determining that the client is associated with a set of configuration parameters via a cloud platform that supports the interface. The operations of 910 may be performed in accordance with examples as disclosed herein. In some examples, aspects of the operations of 910 may be performed by a configuration parameter component 545 as described with reference to FIG. 5.

At 915, the method may include modifying, in accordance with the set of configuration parameters, the prompt that results in a modified prompt. The operations of 915 may be performed in accordance with examples as disclosed herein. In some examples, aspects of the operations of 915 may be performed by a prompt component 525 as described with reference to FIG. 5.

At 920, the method may include transmitting, to the large language model via the model interface, the modified prompt. The operations of 920 may be performed in accordance with examples as disclosed herein. In some examples, aspects of the operations of 920 may be performed by a prompt component 525 as described with reference to FIG. 5.

At 925, the method may include receiving, via a model interface, a streaming output of the large language model, where the streaming output includes a first portion of the response and includes a threshold number of tokens. In some cases, receiving the streaming output is in response to transmitting the modified prompt. The operations of 925 may be performed in accordance with examples as disclosed herein. In some examples, aspects of the operations of 925 may be performed by a streaming component 530 as described with reference to FIG. 5.

At 930, the method may include providing the first portion of the response to a scoring model that determines a first incremental score indicating a first probability that the first portion of the response includes content from one or more content categories. The operations of 930 may be performed in accordance with examples as disclosed herein. In some examples, aspects of the operations of 930 may be performed by a scoring component 535 as described with reference to FIG. 5.

At 935, the method may include transmitting, to the client and based on the first probability, the first portion of the response, an indication of the first incremental score, or both. The operations of 935 may be performed in accordance with examples as disclosed herein. In some examples, aspects of the operations of 935 may be performed by a response component 540 as described with reference to FIG. 5.

A method for data processing by an apparatus is described. The method may include receiving, from a client and at an interface for accessing a large language model, a prompt for a response from the large language model, receiving, via a model interface, a streaming output of the large language model, where the streaming output includes a first portion of the response and includes a threshold number of tokens, providing the first portion of the response to a scoring model that determines a first incremental score indicating a first probability that the first portion of the response includes content from one or more content categories, and transmitting, to the client and based on the first probability, the first portion of the response, an indication of the first incremental score, or both.

An apparatus for data processing is described. The apparatus may include one or more memories storing processor executable code, and one or more processors coupled with the one or more memories. The one or more processors may individually or collectively be operable to execute the code to cause the apparatus to receive, from a client and at an interface for accessing a large language model, a prompt for a response from the large language model, receive, via a model interface, a streaming output of the large language model, where the streaming output includes a first portion of the response and includes a threshold number of tokens, provide the first portion of the response to a scoring model that determines a first incremental score indicating a first probability that the first portion of the response includes content from one or more content categories, and transmit, to the client and based on the first probability, the first portion of the response, an indication of the first incremental score, or both.

Another apparatus for data processing is described. The apparatus may include means for receiving, from a client and at an interface for accessing a large language model, a prompt for a response from the large language model, means for receiving, via a model interface, a streaming output of the large language model, where the streaming output includes a first portion of the response and includes a threshold number of tokens, means for providing the first portion of the response to a scoring model that determines a first incremental score indicating a first probability that the first portion of the response includes content from one or more content categories, and means for transmitting, to the client and based on the first probability, the first portion of the response, an indication of the first incremental score, or both.

A non-transitory computer-readable medium storing code for data processing is described. The code may include instructions executable by one or more processors to receive, from a client and at an interface for accessing a large language model, a prompt for a response from the large language model, receive, via a model interface, a streaming output of the large language model, where the streaming output includes a first portion of the response and includes a threshold number of tokens, provide the first portion of the response to a scoring model that determines a first incremental score indicating a first probability that the first portion of the response includes content from one or more content categories, and transmit, to the client and based on the first probability, the first portion of the response, an indication of the first incremental score, or both.

In some examples of the method, apparatus, and non-transitory computer-readable medium described herein, receiving the streaming output of the large language model may include operations, features, means, or instructions for receiving a new token from the large language model after receiving the first portion of the response.

Some examples of the method, apparatus, and non-transitory computer-readable medium described herein may further include operations, features, means, or instructions for determining a second portion of the response including the threshold number of tokens and the new token and providing the second portion of the response to the scoring model that determines a second incremental score indicating a second probability that the second portion of the response includes content from one or more content categories.

Some examples of the method, apparatus, and non-transitory computer-readable medium described herein may further include operations, features, means, or instructions for transmitting, to the client and based on the second probability, the new token, an indication of the second incremental score, or both.

Some examples of the method, apparatus, and non-transitory computer-readable medium described herein may further include operations, features, means, or instructions for determining whether a difference between the first incremental score and the second incremental score satisfies a threshold, where the indication of the second incremental score may be transmitted to the client based on the difference between the first incremental score and the second incremental score satisfying the threshold.

Some examples of the method, apparatus, and non-transitory computer-readable medium described herein may further include operations, features, means, or instructions for determining that the client may be associated with a set of configuration parameters via a cloud platform that supports the interface, modifying, in accordance with the set of configuration parameters, the prompt that results in a modified prompt, and transmitting, to the large language model via the model interface, the modified prompt, where receiving the streaming output may be in response to transmitting the modified prompt.

In some examples of the method, apparatus, and non-transitory computer-readable medium described herein, modifying the prompt may include operations, features, means, or instructions for determining that the prompt includes one or more elements of sensitive information and replacing the one or more elements of sensitive information with one or more respective masking elements.

In some examples of the method, apparatus, and non-transitory computer-readable medium described herein, the one or more elements of sensitive information include PII, PCI information, PHI, or a combination thereof.

Some examples of the method, apparatus, and non-transitory computer-readable medium described herein may further include operations, features, means, or instructions for determining whether the first probability satisfy a threshold, where the first probability, the first portion of the response, an indication of the first incremental score, or both may be transmitted to the client based on the first probability satisfying the threshold.

Some examples of the method, apparatus, and non-transitory computer-readable medium described herein may further include operations, features, means, or instructions for logging the first probability associated with the first portion of the response, the indication of the first incremental score, or both.

Some examples of the method, apparatus, and non-transitory computer-readable medium described herein may further include operations, features, means, or instructions for receiving, from the client, an input indicating a probability threshold for the first probability, where transmitting the first portion of the response, the indication of the first incremental score, or both, may be based on the first probability satisfying the probability threshold.

The following provides an overview of aspects of the present disclosure:

Aspect 1: A method for data processing, comprising: receiving, from a client and at an interface for accessing a large language model, a prompt for a response from the large language model; receiving, via a model interface, a streaming output of the large language model, wherein the streaming output comprises a first portion of the response and comprises a threshold number of tokens; providing the first portion of the response to a scoring model that determines a first incremental score indicating a first probability that the first portion of the response includes content from one or more content categories; and transmitting, to the client and based at least in part on the first probability, the first portion of the response, an indication of the first incremental score, or both.

Aspect 2: The method of aspect 1, wherein receiving the streaming output of the large language model comprises: receiving a new token from the large language model after receiving the first portion of the response.

Aspect 3: The method of aspect 2, further comprising: determining a second portion of the response comprising the threshold number of tokens and the new token; and providing the second portion of the response to the scoring model that determines a second incremental score indicating a second probability that the second portion of the response includes content from one or more content categories.

Aspect 4: The method of aspect 3, further comprising: transmitting, to the client and based at least in part on the second probability, the new token, an indication of the second incremental score, or both.

Aspect 5: The method of aspect 4, further comprising: determining whether a difference between the first incremental score and the second incremental score satisfies a threshold, wherein the indication of the second incremental score is transmitted to the client based at least in part on the difference between the first incremental score and the second incremental score satisfying the threshold.

Aspect 6: The method of any of aspects 1 through 5, further comprising: determining that the client is associated with a set of configuration parameters via a cloud platform that supports the interface; modifying, in accordance with the set of configuration parameters, the prompt that results in a modified prompt; and transmitting, to the large language model via the model interface, the modified prompt, wherein receiving the streaming output is in response to transmitting the modified prompt.

Aspect 7: The method of aspect 6, wherein modifying the prompt comprises: determining that the prompt comprises one or more elements of sensitive information; and replacing the one or more elements of sensitive information with one or more respective masking elements.

Aspect 8: The method of aspect 7, wherein the one or more elements of sensitive information comprise personally identifiable information (PII), payment card industry (PCI) information, protected health information (PHI), or a combination thereof.

Aspect 9: The method of any of aspects 1 through 8, further comprising: determining whether the first probability satisfy a threshold, wherein the first probability, the first portion of the response, an indication of the first incremental score, or both are transmitted to the client based at least in part on the first probability satisfying the threshold.

Aspect 10: The method of any of aspects 1 through 9, further comprising: logging the first probability associated with the first portion of the response, the indication of the first incremental score, or both.

Aspect 11: The method of any of aspects 1 through 10, further comprising: receiving, from the client, an input indicating a probability threshold for the first probability, wherein transmitting the first portion of the response, the indication of the first incremental score, or both, is based at least in part on the first probability satisfying the probability threshold.

Aspect 12: An apparatus for data processing, comprising one or more memories storing processor-executable code, and one or more processors coupled with the one or more memories and individually or collectively operable to execute the code to cause the apparatus to perform a method of any of aspects 1 through 11.

Aspect 13: An apparatus for data processing, comprising at least one means for performing a method of any of aspects 1 through 11.

Aspect 14: A non-transitory computer-readable medium storing code for data processing, the code comprising instructions executable by one or more processors to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
    receiving, from a client and at an interface for accessing a large language model, a prompt for a response from the large language model;
    receiving, via a model interface, a streaming output of the large language model, wherein the streaming output comprises a first portion of the response and comprises a threshold number of tokens;
    providing the first portion of the response to a scoring model that determines a first incremental score indicating a first probability that the first portion of the response includes content from one or more content categories;
    transmitting, to the client and based at least in part on the first probability, the first portion of the response, an indication of the first incremental score, or both;
    receiving, via the model interface, a second portion of the response that comprises the threshold number of tokens including a new token;
    providing the second portion of the response to the scoring model that determines a second incremental score indicating a second probability that the second portion of the response includes content from the one or more content categories;
    determining whether a difference between the first incremental score and the second incremental score satisfies a threshold; and
    transmitting, to the client based at least in part on the difference between the first incremental score and the second incremental score satisfying the threshold, at least the indication of the second incremental score.

2. The method of claim 1, wherein receiving the streaming output of the large language model comprises:
    receiving the new token from the large language model after receiving the first portion of the response.

3. The method of claim 1, further comprising:
    transmitting, to the client and based at least in part on the second probability, the new token.

4. The method of claim 1, further comprising:
    determining that the client is associated with a set of configuration parameters via a cloud platform that supports the interface;
    modifying, in accordance with the set of configuration parameters, the prompt that results in a modified prompt; and
    transmitting, to the large language model via the model interface, the modified prompt, wherein receiving the streaming output is in response to transmitting the modified prompt.

5. The method of claim 4, wherein modifying the prompt comprises:
    determining that the prompt comprises one or more elements of sensitive information; and
    replacing the one or more elements of sensitive information with one or more respective masking elements.

6. The method of claim 5, wherein the one or more elements of sensitive information comprise personally identifiable information (PII), payment card industry (PCI) information, protected health information (PHI), or a combination thereof.

7. The method of claim 1, further comprising:
    determining whether the first probability satisfy satisfies a probability threshold, wherein the first probability, the first portion of the response, an indication of the first incremental score, or both are transmitted to the client based at least in part on the first probability satisfying the probability threshold.

8. The method of claim 1, further comprising:
    logging the first probability associated with the first portion of the response, the indication of the first incremental score, or both.

9. The method of claim 1, further comprising:
    receiving, from the client, an input indicating a probability threshold for the first probability, wherein transmitting the first portion of the response, the indication of the first incremental score, or both, is based at least in part on the first probability satisfying the probability threshold.

10. An apparatus for data processing, comprising:
    one or more memories storing processor-executable code; and
    one or more processors coupled with the one or more memories and individually or collectively operable to execute the code to cause the apparatus to:
        receive, from a client and at an interface for accessing a large language model, a prompt for a response from the large language model;
        receive, via a model interface, a streaming output of the large language model, wherein the streaming output comprises a first portion of the response and comprises a threshold number of tokens;
        provide the first portion of the response to a scoring model that determines a first incremental score indicating a first probability that the first portion of the response includes content from one or more content categories;
        transmitting, to the client and based at least in part on the first probability, the first portion of the response, an indication of the first incremental score, or both;
        receive, via the model interface, a second portion of the response that comprises the threshold number of tokens including a new token;
        provide the second portion of the response to the scoring model that determines a second incremental score indicating a second probability that the second portion of the response includes content from the one or more content categories;
        determine whether a difference between the first incremental score and the second incremental score satisfies a threshold; and
        transmit, to the client based at least in part on the difference between the first incremental score and the second incremental score satisfying the threshold, at least the indication of the second incremental score.

11. The apparatus of claim 10, wherein, to receive the streaming output of the large language model, the one or more processors are individually or collectively operable to execute the code to cause the apparatus to:
    receive the new token from the large language model after receiving the first portion of the response.

12. The apparatus of claim 10, wherein the one or more processors are individually or collectively further operable to execute the code to cause the apparatus to:
 transmit, to the client and based at least in part on the second probability, the new token.

13. The apparatus of claim 10, wherein the one or more processors are individually or collectively further operable to execute the code to cause the apparatus to:
 determine that the client is associated with a set of configuration parameters via a cloud platform that supports the interface;
 modify, in accordance with the set of configuration parameters, the prompt that results in a modified prompt; and
 transmit, to the large language model via the model interface, the modified prompt, wherein receiving the streaming output is in response to transmitting the modified prompt.

14. The apparatus of claim 13, wherein, to modify the prompt, the one or more processors are individually or collectively operable to execute the code to cause the apparatus to:
 determine that the prompt comprises one or more elements of sensitive information; and
 replace the one or more elements of sensitive information with one or more respective masking elements.

15. The apparatus of claim 14, wherein the one or more elements of sensitive information comprise personally identifiable information (PII), payment card industry (PCI) information, protected health information (PHI), or a combination thereof.

16. A non-transitory computer-readable medium storing code for data processing, the code comprising instructions executable by one or more processors to:
 receive, from a client and at an interface for accessing a large language model, a prompt for a response from the large language model;
 receive, via a model interface, a streaming output of the large language model, wherein the streaming output comprises a first portion of the response and comprises a threshold number of tokens;
 provide the first portion of the response to a scoring model that determines a first incremental score indicating a first probability that the first portion of the response includes content from one or more content categories;
 transmitting, to the client and based at least in part on the first probability, the first portion of the response, an indication of the first incremental score, or both;
 receive, via the model interface, a second portion of the response that comprises the threshold number of tokens including a new token;
 provide the second portion of the response to the scoring model that determines a second incremental score indicating a second probability that the second portion of the response includes content from the one or more content categories;
 determine whether a difference between the first incremental score and the second incremental score satisfies a threshold; and
 transmit, to the client based at least in part on the difference between the first incremental score and the second incremental score satisfying the threshold, at least the indication of the second incremental score.

* * * * *